(12) United States Patent
Dygert

(10) Patent No.: US 10,252,458 B2
(45) Date of Patent: Apr. 9, 2019

(54) CONTAINER AND METHOD OF MANUFACTURE

(71) Applicant: RING Container Technologies, LLC, Oakland, TN (US)

(72) Inventor: Douglas Miles Dygert, Olive Branch, MS (US)

(73) Assignee: RING CONTAINER TECHNOLOGIES, LLC, Oakland, TN (US)

( * ) Notice: Subject to any disclaimer, the term of this patent is extended or adjusted under 35 U.S.C. 154(b) by 246 days.

(21) Appl. No.: 15/211,308

(22) Filed: Jul. 15, 2016

(65) Prior Publication Data

US 2017/0021552 A1   Jan. 26, 2017

Related U.S. Application Data

(60) Provisional application No. 62/194,516, filed on Jul. 20, 2015.

(51) Int. Cl.
*B29C 49/22*   (2006.01)
*B29B 11/08*   (2006.01)
(Continued)

(52) U.S. Cl.
CPC ............ *B29C 49/221* (2013.01); *B29B 11/08* (2013.01); *B29B 11/14* (2013.01);
(Continued)

(58) Field of Classification Search
None
See application file for complete search history.

(56) References Cited

U.S. PATENT DOCUMENTS

| 2003/0124374 A1 | 7/2003 | Bromley et al. |
| 2004/0121097 A1* | 6/2004 | Nahill ............... B29C 49/42 428/35.7 |

(Continued)

FOREIGN PATENT DOCUMENTS

WO   2002000418 A1   1/2002

OTHER PUBLICATIONS

Written Opinion of the International Searching Authority—Form PCT/ISA/237—International Application No. PCT/US2016/042491, Applicant-Ring Container Technologies, International Search Report—Form PCT/ISA/210 dated Nov. 2, 2016 by International Searching Authority—European Patent Office.

*Primary Examiner* — Monica A Huson
(74) *Attorney, Agent, or Firm* — Sorell, Lenna & Schmidt, LLP

(57) ABSTRACT

A method for manufacturing a food and/or beverage packaging container is provided. The method includes injection molding a preform using a two phase injection system. A first phase of the two phase injection system includes injecting a first material into the preform and a second phase of the two phase injection system includes injecting a second material into the preform. The method further includes disposing the preform in a mold, blow molding the preform into an intermediate article having a length, a diameter and side walls having a wall thickness, and trimming the intermediate article to form a finished container having a wide mouth neck. Systems and finished products are disclosed.

20 Claims, 2 Drawing Sheets

(51) Int. Cl.
*B29C 49/06* (2006.01)
*B29C 49/42* (2006.01)
*B29B 11/14* (2006.01)
*B29C 49/00* (2006.01)
*B29C 49/74* (2006.01)
B29K 67/00 (2006.01)
B29K 105/00 (2006.01)
B29L 31/00 (2006.01)
B29K 105/26 (2006.01)

(52) U.S. Cl.
CPC .......... *B29C 49/0073* (2013.01); *B29C 49/06* (2013.01); *B29C 49/4278* (2013.01); *B29C 49/74* (2013.01); B29B 2911/1402 (2013.01); B29B 2911/14033 (2013.01); B29C 2049/225 (2013.01); B29C 2793/009 (2013.01); B29K 2067/003 (2013.01); B29K 2105/0005 (2013.01); B29K 2105/0032 (2013.01); B29K 2105/26 (2013.01); B29L 2031/716 (2013.01)

(56) References Cited

U.S. PATENT DOCUMENTS

| | | | |
|---|---|---|---|
| 2004/0146672 A1* | 7/2004 | Lynch | B29C 49/02 428/35.7 |
| 2010/0092711 A1* | 4/2010 | Atance Orden | B29B 11/14 428/36.91 |
| 2012/0241406 A1 | 9/2012 | Beuerle | |

* cited by examiner

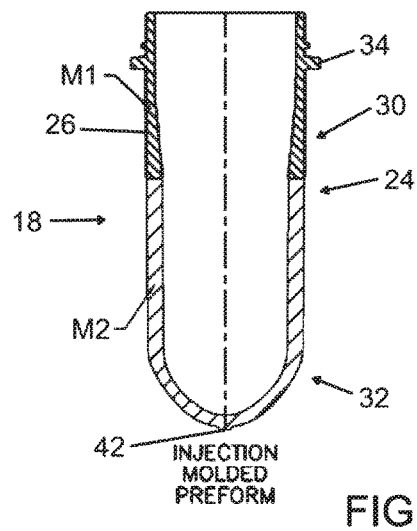
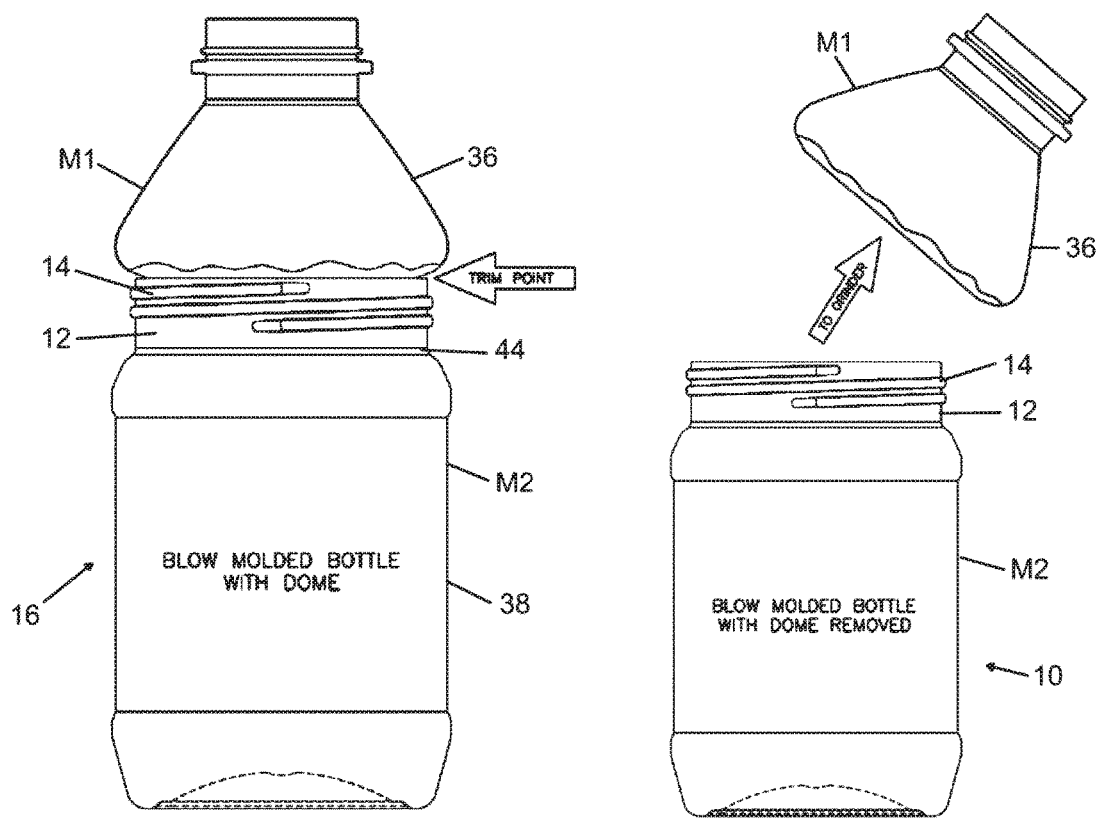

CONTAINER AND METHOD OF MANUFACTURE

TECHNICAL FIELD

The present disclosure generally relates to blow-molded containers and more particularly to wide mouth plastic containers and methods for making the same for food packaging.

BACKGROUND

Plastic blow-molded containers are commonly used for food packaging products. Many food and beverage products are sold to the consuming public in wide mouth jar-like blow-molded containers. These containers can be made from polyethylene terephythalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

Such plastic blow-molded containers may be produced on single stage injection mold equipment. The single stage blow molding process combines the injection molding of the preform and blowing of the container into one machine. This machine has an extruder that melts resin pellets and injects the molten resin into a mold to create the preform. The preform is transferred to a blow station to form the container and removed from the machine. In some cases, the plastic blow-molded containers are produced with two-stage equipment. The two-stage equipment makes preforms in an injection molding machine and then reheats and blows the preforms into selected containers in a separate blowing machine. This disclosure describes an improvement over these prior art technologies.

SUMMARY

In one embodiment, a method for manufacturing a food and/or beverage packaging container is provided. The method includes injection molding a preform using a two phase injection system. A first phase of the two phase injection system includes injecting a first material into the preform and a second phase of the two phase injection system includes injecting a second material into the preform, wherein the first material is different than the second material. The method further includes disposing the preform in a mold, blow molding the preform into an intermediate article having a length, a diameter and side walls having a wall thickness, and trimming the intermediate article to form a finished container having a wide mouth neck. The trimmed portion made from the first material being salvaged, ground and reused. Systems and finished products are disclosed.

BRIEF DESCRIPTION OF THE DRAWINGS

The present disclosure will become more readily apparent from the specific description accompanied by the following drawings, in which:

FIG. 1 is a side cross section view of a component of one embodiment of a container system in accordance with the principles of the present disclosure;

FIG. 2 is a side view of a component of one embodiment of a container system in accordance with the principles of the present disclosure;

FIG. 3 is a side view of a component of one embodiment of a container system in accordance with the principles of the present disclosure.

DETAILED DESCRIPTION

Figure 4:
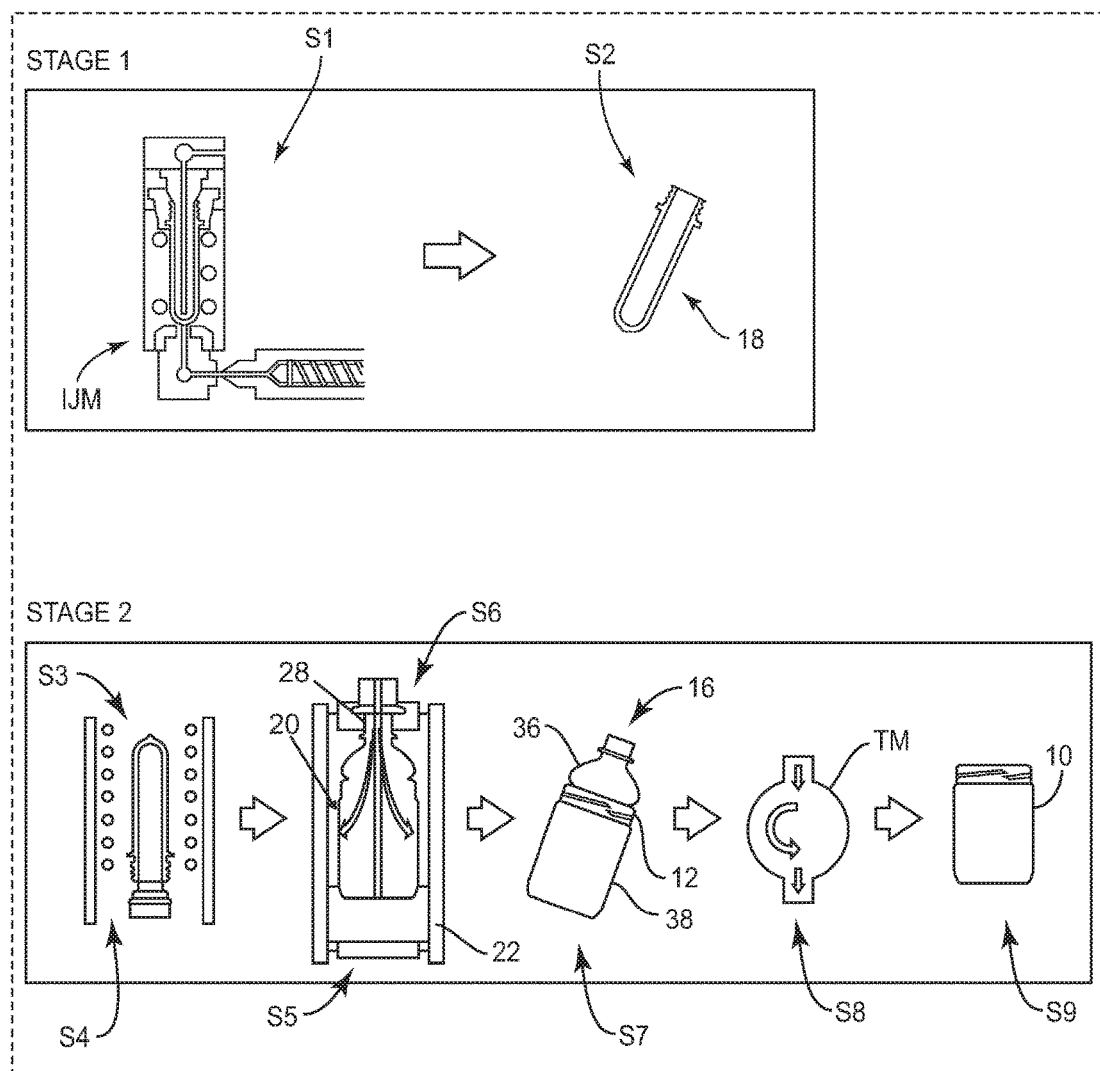
FIG. 4 is a schematic view of a method of manufacturing a container in accordance with the principles of the present disclosure.

The exemplary embodiments of blow-molded containers and more particularly, wide mouth polyethylene terephythalate (PET) containers and methods for making the same are discussed in terms of food packaging products. In some embodiments, the present container is manufactured via an injection molded preform, which is subjected to a blow mold and trim process. In some embodiments, the present container can be filled with food, food preparation oils, viscous and/or beverage products. In some embodiments, the present container can be employed as a cold fill container. In some embodiments, the present container can be employed as a hot fill container. In some embodiments, the present container is manufactured as a 22 ounce container filled with a non-dairy creamer. In some embodiments, the present container is manufactured as a one kilogram container filled with a non-dairy creamer. In some embodiments, the present container is manufactured as a 60 ounce container filled with peanut butter. In some embodiments, the present container is employed as a light weight, high strength and barrier food packaging product.

In some embodiments, the present disclosure includes a container system that is employed with a method for manufacturing food packaging having the ability to produce food packages in a manner that minimizes the cost of scrap material and/or allows the scrap material to be reused in other applications, such as, for example, the manufacturing of other food packaging, as described herein.

In some embodiments, the present disclosure includes a method of producing a wide mouth container wherein rather than the barrier material being located only in a discrete layer and not throughout the preforms, a comingled material, such as, for example, polyethylene terephthalate (PET) and an oxygen scavenger, is targeted only in the areas needed in the blow molding container and not in the dome or moil scrap.

In some embodiments, the scrap material produced in manufacturing the wide mouth container is free of material additives so that the scrap material may be reused in subsequent manufacturing procedures, such as, for example, manufacturing additional wide mouth containers. Providing scrap material that is free of additives allows for full utilization of the scrap material and avoids processing issues associated with reprocessing scrap material that normally would contain additives and barrier materials.

In some embodiments, the present disclosure includes a method of producing a wide mouth container wherein scrap material produced in manufacturing the wide mouth container is free of material additives, such as, for example, passive oxygen scavengers, active oxygen scavengers, colorants, calcium carbonate fillers and foaming agents. These additives serve particular functions in a PET bottle or container. In some embodiments, the scrap material produced in manufacturing the wide mouth container is a dome or moil scrap that is trimmed from an intermediate article to form the wide mouth container. In blow and trim applications where a portion of the blown container is removed from the final bottles (dome, moil, etc.) it is desirable to not have these additives in the portion that is being removed. There are numerous reasons for not having these additives in the removed portion of the bottle, such as, for example, cost savings and reprocessing issues. Indeed, many of these additives are expensive and it is desirable not to add extra cost into sections of the bottle that will not be used in the marketplace. Moreover, these additives can cause considerable reuse issues in the grinding, drying and extrusion processes of the dome and moil. Processors want to be able to reintroduce this scrap material back into their processes so as not to lose the cost of the PET. In some embodiments, these additives can cause clarity issues, yellowing, varying color percentages and activation of the active oxygen scavengers when reintroduced in the process along with virgin PET.

In blow and trim applications, the presence of a discrete layer of additives in the preform can cause layer delamination issues at the trim point on the bottle. In some embodiments, the present disclosure avoids this by stopping the multi-layered preform material short of the trim point, which allows for a section of the blown bottle (primarily in the neck finish) not to have the needed additive present. In the event that the trim point is not a discrete line, the metal or plastic cover overlapping the thread portion would act as a physical oxygen block and little to no loss in oxygen blocking would occur in this region.

In some embodiments, the present disclosure involves a two phase injection system. In a first phase of the two phase injection system, virgin PET is injected into a preform. In a second phase of the two phase injection system, PET and one or more selected additives are injected into the preform. That is, the PET and one or more selected additives are injected into the preform in a second injection cycle. In some embodiments, the second phase begins after the first phase is completed. This allows a dome or moil section of the blown bottle that is trimmed from a finished container and is ultimately ground, blended, dried and added to the virgin PET melt stream to be free of additives which will prevent the problems discussed above when the scrap is reused. In some embodiments, the term "virgin PET" refers to a material that consists solely of PET. That is, virgin PET does not include any additives, such as, for example, the additives discussed above.

It is envisioned that the present disclosure may be useful for manufacturers that run multiple sizes of blow and trim bottles for various end uses. For example, the present disclosure may be useful to produce containers for food items, such as, for example, dressings, sauces and peanuts, wherein oxygen permeation through the side walls of the container negatively affect shelf life and/or product flavor. It is envisioned that the present disclosure may be useful to produce containers for food items, such as, for example, non-dairy coffee creamers that require color pigment for both fill-line concealment and product protection against UV light penetration. Other containers that can be made from the disclosed process include containers for mayonnaise, salad dressings, peanuts as well as other condiments and/or food products.

As shown in the table below, the dome or moil section of the blown container constitutes 15%-40% of the total injected preform weight.

| Trim-Lite Preform Weight Versus Bottles Weight | | | | |
|---|---|---|---|---|
| Product | Preform Weight (grams) | Bottle Weight (grams) | Scrap Weight (grams) | Percent of scrap to bottle |
| 15 oz Mayonnaise | 39 | 25.5 | 13.5 | 34.62% |
| 30 oz Mayonnaise | 56 | 42.0 | 14 | 25.00% |
| 16 oz Peanut | 52 | 40.0 | 12 | 23.08% |
| 1 Kg Non-Diary Coffee Creamer | 74 | 60.0 | 14 | 18.92% |
| 22 oz Non-Dairy Coffee Creamer | 54 | 40.0 | 14 | 25.93% |

This material must be ground and reprocessed back into the system for economic considerations. Due to the high percentage of scrap material in the blown containers, it is desirable to produce scrap material that is free of any additives, such as, for example, the additives discussed above, to avoid wasting expensive additives and/or avoid complications or costs involved in processing scrap material that includes additives relative to scrap material that does not include additives.

In some embodiments, the present manufacturing method includes the steps of employing a single stage blow molding process and providing a preform that produces containers having a dome. In some embodiments, the method includes injection molding the preform using a two phase injection system, wherein a first phase of the two phase injection system comprises injecting a first material into the preform and a second phase of the two phase injection system comprises injecting a second material into the preform. The first material having a different configuration profile than the second material. In some embodiments, the first material is virgin PET without additives and the second material is PET with additives. This allows the first material section to be reground as virgin PET so as to avoid regrinding issues discussed above.

In some embodiments, the method includes the step of testing the one or more preforms to ensure the one or more preforms include a selected weight and selected neck finish dimension. In some embodiments, the method includes the step of employing the one or more preforms with a four cavity production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container. In some embodiments, the method includes reusing the dome to produce other containers, such as, for example other wide mouth containers. In some embodiments, reusing the dome includes grinding, blending, drying and adding the dome and adding the ground, blended and dried material to a melt stream, wherein the done does not contain additives.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a container system for producing food packaging products, a container, related components and methods of manufacturing a container with an injection molded preform. Alternate embodiments are also disclosed. Reference is made in detail to the exemplary embodiments of the present disclosure, which are illustrated in the accompanying figures. Turning to FIGS. 1-4, there are illustrated components of a container system and methods of manufacturing a container.

A finished PET blow-molded, wide mouth container 10, as shown in FIG. 3, is constructed for use with a selected application, as described herein. In some embodiments, the selected application includes food, food preparation oils, viscous and/or beverage products. In some embodiments, the selected application includes a 15 ounce container filled with mayonnaise. In some embodiments, the selected application includes a 30 ounce container filled with mayonnaise. In some embodiments, the selected application includes a 16 ounce container filled with peanuts. In some embodiments, the selected application includes a 1 kilogram container filled with non-dairy coffee creamer. In some embodiments, the selected application includes a 22 ounce container filled with non-dairy coffee creamer.

In some embodiments, finished container 10 comprises a bottle for food and/or beverage product packaging having a cylindrical threaded neck 12 wherein an outer diameter has a continuous thread 14. In some embodiments, thread 14 is in a range of about 53 mm to about 162 mm. In some embodiments, finished container 10 is manufactured via a two-stage method, as described herein. In some embodiments, finished container 10 has an outer finish diameter in a range of about 53 mm to about 120 mm. In some embodiments, finished container 10 is manufactured via a single stage method, as described herein. In some embodiments, finished container 10 has an outer finish diameter of about 162 mm. Container 10 is produced as a lower part of an intermediate article 16, as shown in FIG. 2. In some embodiments, container 10 is formed by injection molding a preform 18 and then placing preform 18 into a cavity of a mold assembly, to be blown.

In some embodiments, container 10 is manufactured via a two-stage method, as shown in FIG. 4. In some embodiments, an initial step S1 includes injection molding preform 18 in an injection molding machine IJM during a first stage of the manufacturing operation. Preform 18 has a thread forming surface 24 below a preform neck 26. In some embodiments, preform 18 has thread forming surface 24, which includes a portion of preform 18 below neck 26 that will press against mold assembly 22 to form neck 12 and thread 14. In some embodiments, container 10 may be manufactured with a snap fit portion, spiral threads and/or a beaded rim. In some embodiments, preform 18 can be injection molded with a neck diameter smaller than the neck diameter of finished container 10, such that a diameter of an opening 28 at a top of mold assembly 22 is substantially reduced. As such, a plurality of mold cavities may be placed in mold assembly 22 of a blow machine of the two-stage equipment to provide improved production capacity. In some embodiments, container 10 may be manufactured with a hoop stretch ratio in a range of about 1.6 to 1 to about 2.0 to 1. In some embodiments, a step S2 includes removing preform 18 from machine IJM.

In some embodiments, injection molding preform 18 comprises injection molding preform 18 using a two phase injection system, wherein a first phase of the two phase injection system comprises injecting a first material M1 into preform 18 and a second phase of the two phase injection system comprises injecting a second material M2 into preform 18. This results in material M1 forming a top portion of preform 18 and material M2 forming a bottom portion of preform 18. Material M1 is different than material M2. In some embodiments, material M1 is virgin PET and material M2 comprises PET and at least one additive. In some embodiments, material M1 is PET and material M2 comprises PET and at least one additive. In some embodiments, the at least one additive in M2 is selected from a group consisting of passive oxygen scavengers, active oxygen scavengers, colorants, calcium carbonate fillers and foaming agents.

In some embodiments, the two-stage method includes one or more steps in a second stage of the manufacturing operation. For example, in a step S3 of the second stage, preform 18 is provided having a dome forming surface 30, thread forming surface 24 and a body forming surface 32. In some embodiments, the second stage includes a step S4, which comprises pre-heating preform 18 to a temperature in a range of about 95 degrees Celsius (C) to about 110 degrees C. In some embodiments, dome forming surface 30 is formed solely from material M1, for example, virgin PET. That is, dome forming surface 30 is free of material M2 and does not contain any additives. In some embodiments, thread forming surface 24 is formed solely from material M2. That is, thread forming surface 24 is free of material M1 and contains additives. In some embodiments, body forming surface 32 is formed solely from material M2. That is, body forming surface 32 is free of material M1 and contains additives.

In some embodiments, the second stage includes a step S5, which comprises mounting pre-heated preform 18 in place within cavity 20 of mold assembly 22. Mold assembly 22 has an interior mold surface shaped to correspond to the selected configuration of container 10. In some embodiments, the temperature of mold assembly 22 is in a range of about 40 degrees Fahrenheit (F) to about 110 degrees F. Preform 18 has a flange 34, which mounts on mold assembly 22 adjacent opening 28. Preform 18 has surface 30 that forms dome 36 of intermediate article 16, surface 24 that forms neck 12 of intermediate article 16 and surface 32, which forms body 38 of intermediate article 16. In some embodiments, surface 30 has a wall thickness in a range of about 0.100 inches (in) to about 0.200 in. In some embodiments, surface 24 has a wall thickness in a range of about 0.100 in to about 0.200 in. In some embodiments, surface 32 has a wall thickness in a range of about 0.100 in to about 0.200 in.

A step S6 includes blowing air into preform 18 to mold intermediate article 16, as shown in FIG. 4. In some embodiments, air is blown from a dryer and at a pressure in a range of about 35 to about 40 bar blown into an open end 40 of preform 18 to stretch or extend surfaces 30, 24, 32 and a bottom surface 42 of preform 18 radially outwardly and axially downwardly against the interior molding surface of mold assembly 22, as shown in FIG. 3. A step S7 includes removing intermediate article 16 from mold assembly 22.

In some embodiments, preform 18 has a diameter of about 3.3 inches adjacent surface 24 and a length of about 6.2 inches; and intermediate article 16 has a diameter of about 6 inches and a length of about 10.3 inches. In some embodiments, finished container 10, after trimming of intermediate article 16 as described herein, has a maximum diameter of about 7.25 inches.

In some embodiments, dome 36 is attached to an upper edge of neck 12 along an annular recess 44. In some embodiments, the second stage includes a step S8, which comprises removing and/or trimming off dome 36 from intermediate article 16 adjacent neck 12 with a trimming machine TM. Dome 36 is severed from intermediate article 16 to produce finished container 10, as shown in FIG. 3. As such, the second stage includes a step S9 of providing finished container 10.

In some embodiments, dome 36 is scrap material that may be reused in another manufacturing process, such as, for example, the manufacturing of another container, such as, for example, another wide mouth container. In such embodiments, dome may be free of any of the additives discussed above due to the two phase injection system of preform 18 discussed above.

Dome 36 may be ground, blended, dried and added to a melt stream to produce a second preform. In some embodiments the melt stream includes virgin PET without any other additives. In some embodiments the melt stream includes PET in addition to one or more of the additives discussed above. In some embodiments the melt stream includes virgin PET without any other additives and one or more of the additives discussed above is added to the melt stream after ground, blended and dried dome 36 is added to the melt stream. The second preform is disposed in a mold, similar to step S3 discussed above. The second preform may then be pre-heated, similar to step S4 discussed above. In some embodiments, the preheated second preform is mounted in place within a cavity of a mold, such as, for example, cavity 20 of mold assembly 22, similar to step S5 discussed above. In some embodiments, the second preform is air blown to mold a second intermediate article similar to intermediate article 16, similar to step S6 discussed above. The second intermediate article is removed from the mold assembly, similar to step S7 discussed above. In some embodiments, a dome of the second intermediate article, similar to dome 36, is removed and/or trimmed off from the second intermediate article adjacent a neck of the second intermediate article that is similar to neck 12 with a trimming machine, such as, for example trimming machine TM. The dome of the second intermediate article is severed from the second intermediate article to produce a second finished container that is similar to finished container 10.

In some embodiments, finished container 10 and/or the second finished container, as described herein, can be fabricated from materials suitable for food packaging products. In some embodiments, such materials include synthetic polymers such as thermoplastics, semi-rigid and rigid materials, elastomers, fabric and/or their composites.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for manufacturing a food and/or beverage packaging container, the method comprising the steps of:
   injection molding a preform using a two phase injection system, wherein a first phase of the two phase injection system comprises injecting a first material into the preform and a second phase of the two phase injection system comprises injecting a second material into the preform;
   disposing the preform in a mold;
   blow molding the preform into an intermediate article having a length, a diameter and side walls having a wall thickness; and
   trimming the intermediate article to form a finished container having a wide mouth neck, wherein trimming the intermediate article forms the finished container and produces scrap material, the finished container comprising the first material and the scrap material comprising the second material, the scrap material being free of the first material.

2. A method as recited in claim 1, wherein the first material is different than the second material.

3. A method as recited in claim 1, wherein the first material is virgin polyethylene terephythalate (PET) and the second material comprises PET and at least one additive.

4. A method as recited in claim 3, wherein the at least one additive comprises at least one of a group consisting of passive oxygen scavengers, active oxygen scavengers, colorants, calcium carbonate fillers and foaming agents.

5. A method as recited in claim 1, wherein the first material consists of polyethylene terephythalate (PET) and the second material comprises PET and at least one additive.

6. A method as recited in claim 5, wherein the at least one additive comprises at least one of a group consisting of passive oxygen scavengers, active oxygen scavengers, colorants, calcium carbonate fillers and foaming agents.

7. A method as recited in claim 1, wherein the finished container is free of the second material.

8. A method as recited in claim 1, wherein the method further comprises using the scrap material to manufacture a second food and/or beverage packaging container.

9. A method as recited in claim 1, wherein the second phase occurs after the first phase is completed.

10. A method as recited in claim 1, wherein trimming the intermediate article includes a spin trim operation to remove a dome from the intermediate article.

11. A method for manufacturing food and/or beverage packaging containers, the method comprising the steps of:
   producing a first finished container by:
      injection molding a first preform using a two phase injection system, wherein a first phase of the two phase injection system comprises injecting a first material into the first preform and a second phase of the two phase injection system comprises injecting a second material into the first preform,
      disposing the first preform in a mold,
      blow molding the first preform into a first intermediate article having a length, a diameter and side walls having a wall thickness, and trimming the first intermediate article to form the first finished container and produce scrap material, the first finished container having a wide mouth neck, the first finished container comprising the first material and the scrap material comprising the second material, the scrap material being free of the first material; and producing a second finished container by:
injecting the scrap material into a second preform,
disposing the second preform in a mold,
blow molding the second preform into a second intermediate article having a length, a diameter and side walls having a wall thickness, and
trimming the second intermediate article to form the second finished container.

12. A method as recited in claim 11, wherein the first material is different than the second material.

13. A method as recited in claim 11 wherein the first material is virgin polyethylene terephythalate (PET) and the second material comprises PET and at least one additive.

14. A method as recited in claim 13, wherein the at least one additive comprises at least one of a group consisting of passive oxygen scavengers, active oxygen scavengers, colorants, calcium carbonate fillers and foaming agents.

15. A method as recited in claim 11, wherein the first material consists of polyethylene terephythalate (PET) and the second material comprises PET and at least one additive.

16. A method as recited in claim 15, wherein the at least one additive comprises at least one of a group consisting of passive oxygen scavengers, active oxygen scavengers, colorants, calcium carbonate fillers and foaming agents.

17. A method as recited in claim 11, wherein the second phase occurs after the first phase is completed.

18. A method for manufacturing food and/or beverage packaging containers, the method comprising the steps of:
producing a first finished container by:
injection molding a first preform using a two phase injection system, wherein a first phase of the two phase injection system comprises injecting a first material into the first preform and a second phase of the two phase injection system comprises injecting a second material into the first preform,
disposing the first preform in a mold,
blow molding the first preform into a first intermediate article having a length, a diameter and side walls having a wall thickness, and
trimming the first intermediate article to form the first finished container and produce scrap material, the first finished container having a wide mouth neck; and producing a second finished container by:
injecting the scrap material into a second preform,
disposing the second preform in a mold,
blow molding the second preform into a second intermediate article having a length, a diameter and side walls having a wall thickness, and
trimming the second intermediate article to form the second finished container,
wherein the first finished container comprises the first material and the scrap material comprises the second material, the scrap material being free of the first material and the finished container being free of the second material.

19. A method as recited in claim 18, wherein the first material consists of polyethylene terephythalate (PET) and the second material comprises PET and at least one additive.

20. A method as recited in claim 19, wherein the at least one additive comprises at least one of a group consisting of passive oxygen scavengers, active oxygen scavengers, colorants, calcium carbonate fillers and foaming agents.

* * * * *